(12) United States Patent
Tembaak et al.

(10) Patent No.: US 9,370,271 B2
(45) Date of Patent: Jun. 21, 2016

(54) SUPPLY CONTAINER FOR A DESCALING SYSTEM, AUTOMATIC BEVERAGE MAKER, AND METHOD FOR DESCALING AN AUTOMATIC BEVERAGE MAKER

(71) Applicant: Miele & Cie. KG, Guetersloh (DE)

(72) Inventors: Jutta Tembaak, Westerkappeln (DE); Mario Last, Bielefeld (DE); Juergen Johann, Mondsee (AT)

(73) Assignee: MIELE & CIE. KG, Guetersloh (DE)

( * ) Notice: Subject to any disclaimer, the term of this patent is extended or adjusted under 35 U.S.C. 154(b) by 218 days.

(21) Appl. No.: 14/016,257

(22) Filed: Sep. 3, 2013

(65) Prior Publication Data

US 2014/0060338 A1    Mar. 6, 2014

(30) Foreign Application Priority Data

Sep. 6, 2012   (EP) .................................... 12401182

(51) Int. Cl.
  *A47J 31/00* (2006.01)
  *B08B 9/032* (2006.01)
  *A47J 31/60* (2006.01)

(52) U.S. Cl.
  CPC ........ *A47J 31/00* (2013.01); *A47J 31/60* (2013.01); *B08B 9/032* (2013.01); *Y10T 137/0424* (2015.04); *Y10T 137/4891* (2015.04)

(58) Field of Classification Search
  CPC ........................................................ A47J 31/00
  USPC ...................................................... 99/279–315
  See application file for complete search history.

(56) References Cited

U.S. PATENT DOCUMENTS

| | | | |
|---|---|---|---|
| 4,100,394 A * | 7/1978 | Tilp ............................... | 392/471 |
| 6,889,603 B2 * | 5/2005 | Carhuff et al. ................... | 99/452 |
| 2008/0271608 A1 * | 11/2008 | Morin ............................. | 99/294 |
| 2009/0293733 A1 * | 12/2009 | Martin et al. .................... | 99/280 |
| 2010/0300299 A1 * | 12/2010 | Epars et al. ...................... | 99/288 |
| 2011/0030732 A1 * | 2/2011 | Boussemart ..................... | 134/18 |
| 2011/0114131 A1 * | 5/2011 | Ying ........................... | 134/22.12 |
| 2011/0259207 A1 * | 10/2011 | Ozanne et al. ................ | 99/323.3 |
| 2011/0311694 A1 * | 12/2011 | Broennimann et al. ....... | 426/474 |
| 2012/0121769 A1 * | 5/2012 | Castellani et al. ............ | 426/237 |

FOREIGN PATENT DOCUMENTS

| | | | |
|---|---|---|---|
| EP | 2265158 B1 | 12/2010 | |
| WO | WO2010010104 | * 1/2010 | |

* cited by examiner

*Primary Examiner* — David Angwin
*Assistant Examiner* — Michael LaFlame, Jr.
(74) *Attorney, Agent, or Firm* — Leydig, Voit & Mayer, Ltd.

(57) ABSTRACT

A supply container forming part of a descaling system of a flowline system includes a housing having a water inlet supplied by a water source. The water inlet opens into a reservoir chamber containing a water-soluble descaling agent. A bottom chamber is in fluid communication with the reservoir chamber. The bottom chamber is configured to collect the descaling agent dissolved by the water. A capillary line discharges a solution of the descaling agent.

18 Claims, 4 Drawing Sheets

SUPPLY CONTAINER FOR A DESCALING SYSTEM, AUTOMATIC BEVERAGE MAKER, AND METHOD FOR DESCALING AN AUTOMATIC BEVERAGE MAKER

CROSS REFERENCE TO RELATED APPLICATIONS

This application claims priority from European Patent Application No. EP 12 401 182, filed Sep. 6, 2012, which is hereby incorporated by reference herein in its entirety.

BACKGROUND

Deposits of calcium carbonate or magnesium carbonate pose a particular problem in water-carrying flowline systems and technical equipment because they can significantly affect the functioning of such systems and equipment over time. Calcium carbonate and magnesium carbonate are commonly also referred to as "scale". Various descaling agents are known and in use which are capable of dissolving scale in flowline systems and technical equipment via a chemical reaction. However, such agents must be used repeatedly at regular intervals because otherwise the deposits may grow to such an extent that the flowline systems and technical equipment become inoperable. In such a case, typically, complex and expensive repairs are required.

From European Patent Document EP 2 265 158 B1, there is known a supply container for receiving a water-soluble descaling agent, which may be used, for example, in an automatic beverage maker and which has a housing and is supplied with water from a water source. A separate mixture outlet of this supply container ensures that the dissolved descaling agent is discharged into the flowline system so as to produce its desired effect therein. For this purpose, the throughflow principle is used. This means that the water flows from the water inlet to the mixture outlet, passing through and dissolving the quantity of descaling agent that was introduced by the user at one time, and is discharged as a mixture through the mixture outlet into the flowline system.

However, this approach has the disadvantage that the user must initially fill a specified amount of descaling agent and a specified amount of water into the supply container prior to descaling in order to be able to subsequently perform the descaling procedure. Moreover, the described throughflow turns out to be disadvantageous because it cannot always ensure that the water filled into the supply container will actually dissolve the entire amount of descaling agent. Since the chemical reaction of the solution is very much temperature-dependent, fluctuations may have negative effects in this regard. However, incomplete dissolution of the descaling agent may have serious consequences because the desired effect is not achieved to the extent required. Therefore, there is a need to use the descaling agent in very accurately meterable quantities and to provide a stored supply thereof that allows effective descaling of the flowline system over a long period of time. This, however, gives rise to another problem of this known design. Since the supply container is disposed directly in the portion of the flowline system that is also used for preparing the beverages, there is the disadvantage that, in the event that the descaling agent may not have been entirely dissolved during the descaling procedure, any remaining descaling agent is dissolved and can therefore enter the beverage. This is not only disadvantageous for the taste, but rather may have detrimental effects on health.

SUMMARY

In an embodiment, the present invention provides a supply container forming part of a descaling system of a flowline system includes a housing having a water inlet suppliable by a water source. The water inlet opens into a reservoir chamber configured to receive a water-soluble descaling agent. A bottom chamber is in fluid communication with the reservoir chamber. The bottom chamber is configured to collect the descaling agent dissolved by the water. A capillary line connected to the bottom chamber for discharging a solution of the descaling agent.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
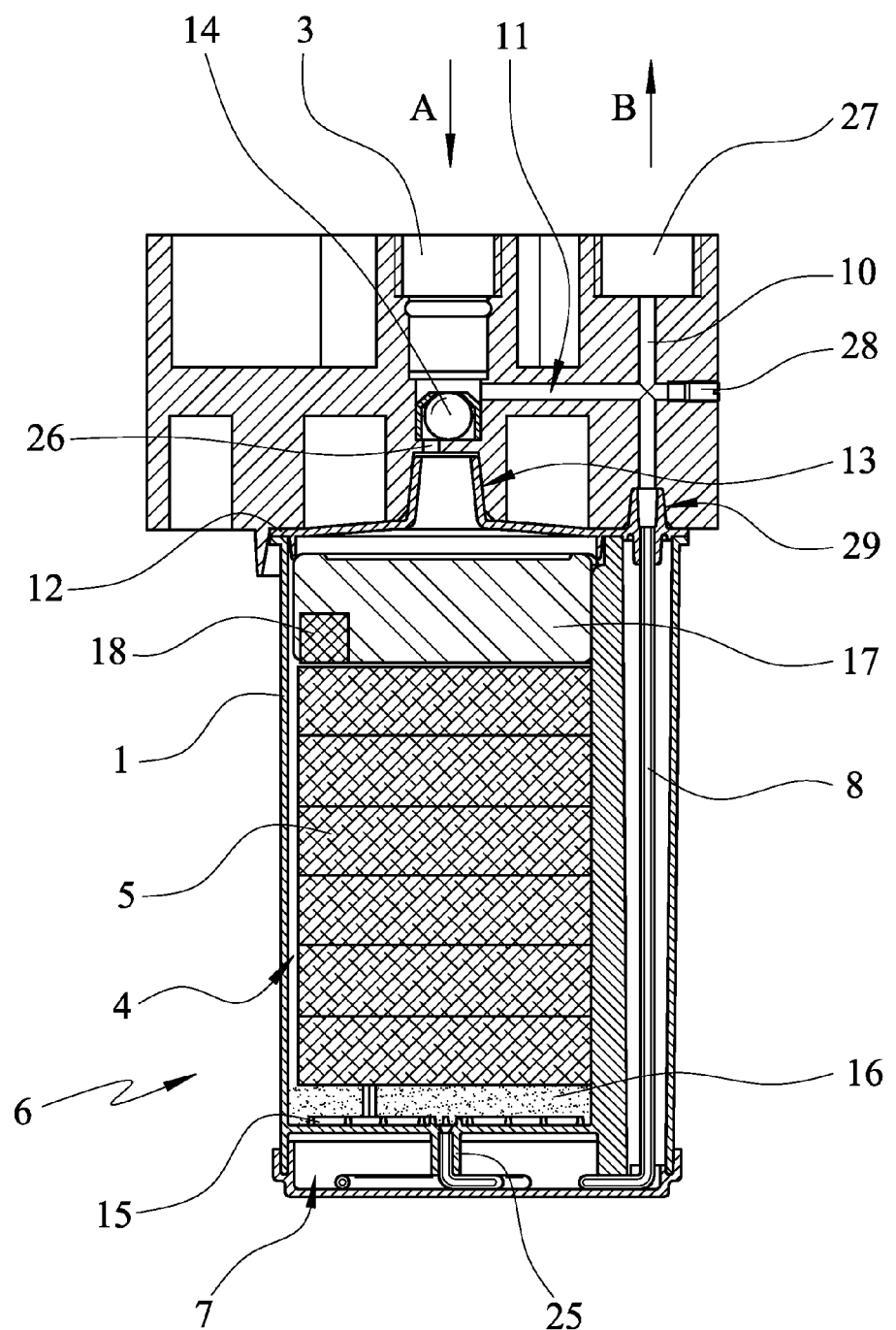
FIG. 1 is a longitudinal sectional view through a supply container and a portion of an adjoining receiving device.

An aspect of the present invention is to provide a supply container for a descaling system which will enable very accurate metering of the descaling agent being fed into the flowline system. Moreover, the water-carrying flowline system should preferably be capable of being properly isolated from that portion of the flowline system in which the supply container is located. Another aspect is to illustrate, by means of an automatic beverage maker, how such a supply container may be used, and to provide a method for descaling such an automatic beverage maker which method allows the flowline system to be descaled as extensively and thoroughly as possible.

A supply container which forms part of a descaling system of a flowline system and has a housing having a water inlet which is supplied by a water source and opens into a reservoir chamber that contains a water-soluble descaling agent is improved in accordance with the present invention in that the supply container has a bottom chamber which is in fluid communication with the reservoir chamber and adapted to collect the descaling agent dissolved by the water and into which opens a capillary line for discharging the solution.

In addition to the possibility of cutting off the capillary line, and thus the flow of the dissolved descaling agent to the flowline system, another advantage offered by the present invention is that it allows a sufficient quantity of descaling agent to be stored in the supply container, and that the descaling agent can in each instance be dissolved and withdrawn in accordance with demand. Once filled, such a supply container may perfectly be available for a period of one year or longer for performing the required descaling procedures. This is due to the fact that only a portion of the descaling agent contained in the supply container is dissolved by the freshly admitted water at any one time, because, preferably, a saturated solution is produced within the supply container and a chemical equilibrium is established. The possibility of dispensing accurately metered quantities provides the additional advantage that the required quantity of dissolved descaling agent fed into the flowline system can be accurately adjusted to the hardness of the local water. This obviously allows for a particularly economical use of the available resources, making a significant contribution to environmental protection.

Moreover, by incorporating the supply container as a bypass into the flowline system, it is possible to achieve proper isolation between the portion of the flowline system that is used for preparing the beverages and the portion of the flowline system in which the supply container for descaling is located. In other words, the supply container is located in a portion of the flowline system that branches from the water-carrying portion and can be isolated by isolation valves.

With regard to the descaling agent, it is noted that this agent is preferably in a viscous state or in powder form, or in the form of tablets pressed from powder, and that the descaling agent is citric acid, malic acid, or another biodegradable acid. The use of a descaling agent which is in powder form or compressed into tablets and which forms an acid when united with water allows the descaling agent to be provided in convenient portions. The descaling agent is mixed with water to form an acid because acid is capable of dissolving scale in a particularly advantageous manner. The greater the dissociating power of the acid, the faster the removal of scale residues from the flowline system and units that may be present therein. In addition to this, the tablet form, or more generally speaking, the compressed and thus compacted form of the descaling agent, and also a descaling agent in powder form, offer further advantages. Firstly, compared to liquid descaling agents or cation exchangers, the supply container can be designed to be relatively small. In addition, because of the limitations on the cross-border transportation of liquids, descaling agents in liquid form pose a problem when it comes to exportation. To be able to export across borders, it is often required to complete extensive approval processes. Another advantage of descaling agents in powder form is that powder does not change its state of aggregation, even under extreme thermal conditions. For example, storage and transportation conditions in the range from −20° C. to +70° C. are not uncommon. It is only descaling agents in powder form that can resist such conditions without the risk of deterioration in quality. Moreover, liquid descaling agents have a risk of leaking out in the event a package is damaged. Using descaling agents in powder form, it is possible to prevent the damage that would result from this.

Depending on its concentration, acid can be a very aggressive medium and, therefore, health and environment protection is of particular importance. Because of this, not every acid can be used unconditionally for the purposes of the present invention. Finally, consideration must also be given to the fact that such a descaling agent may sometimes also be handled by laymen. Consequently, any accident hazards that may result from this must be prevented at all times. It is therefore proposed that the descaling agent be citric acid, malic acid, or another biodegradable acid. This eliminates problems associated with the disposal of the products that result from the descaling process. Moreover, the acid is easy to handle and does not cause extremely severe harm, even in the event of improper use.

Further problems of water-carrying flowline systems include the risk of germs growing in the flowline system. Germ growth can be observed in particular when the liquid stands in the flowline system over a certain period of time and/or when there exists a warm environment, which further promotes the growth of germs. If such a flowline system is not sufficiently cleaned on a regular basis and freed just as regularly from deposits such as the aforedescribed scale, then this also promotes germ growth, which is a problem especially in the case of automatic beverage makers. As a result of these considerations, a sterilization agent is added to the descaling agent. Therefore, the term "descaling agent" will hereinafter be understood to include also descaling agents which may contain a sterilization agent. Such a sterilization agent may be, for example, sorbic acid. With regard to the capillary line, it is further noted that the pressure condition in the capillary line is determined by the length and the inside diameter of the capillary line. Therefore, it is preferred to use, as the capillary line, a flowline which has a very small inside diameter and a great length in relation of the inside diameter.

In accordance with a first embodiment of the present invention, it is proposed that the amount of dissolved descaling agent that is fed through the capillary line into the flowline system during a descaling process be approximately equal to the amount of water that is fed into the reservoir chamber through the water inlet. In other words, in this first proposal, the principle of volume displacement is used, and the amount of water supplied is just equal to the amount of descaling agent to be dispensed.

Alternatively, in another embodiment of the present invention, the end of the capillary line opposite the bottom chamber opens into a water-carrying flowline of the flowline system in such a way that the flow of water in this flowline generates a negative pressure in the capillary line, which draws the descaling agent therethrough. Thus, in this case, the negative pressure principle is used, in accordance with which the amount of dissolved descaling agent discharged through the capillary line correlates with the pressure in the associated flowline. The amount of descaling agent discharged from the capillary line for each descaling process may, for example, be 0.2 to 0.4 ml. However, this means that the amount of fresh water that is fed into the reservoir chamber for descaling is also less than 1 ml.

In order to perform the descaling of a flowline system in an optimal manner, descaling agent concentrations between 10 and 50 mmol/l have been found to be particularly advantageous. With such a range, a completely filled supply container may be used for more than one year without needing to be refilled, while the required descaling intensity is still provided.

In a refinement of the present invention, the capillary line is at least partially spirally wound. As mentioned earlier, the length-to-diameter ratio of the capillary line is decisive for the controlled release of the dissolved descaling agent into the flowline system. Since the supply container should not be too large, it is advantageous for the capillary line to be spirally wound within the supply container. This makes it possible to save valuable space and to make the supply container very compact. One option is for the capillary line to be wound in the region of the reservoir chamber; i.e., around the outer periphery of the reservoir chamber. Another option is to arrange the capillary line in loops within the bottom chamber.

A further very advantageous measure proposed by the present invention is to provide the capillary line with a restriction and/or to provide a restriction in a flowline of the flowline system which supplies fresh water to the supply container. The restriction in the flowline for supplying fresh water produces a back pressure in this line, as a result of which an accurately definable amount of fresh water is forced into the supply container, causing the dissolution of the descaling agent and the displacement thereof, so that the dissolved descaling agent can be released into the flowline system through the capillary line. Of course, a butterfly valve or a fluid line or flowline having an overall reduced size may also be used instead of the above-mentioned restriction, which, in general terms, is a reduction in the cross-sectional area of the flowline.

Due to its reduced inside diameter, the capillary line itself already constitutes a restriction, but may also be provided with an additional restriction in order, for example, to further improve the flow conditions in this manner.

Although, in accordance with the present invention, a supply container, once filled, can be used for a very long period of time, there will come a moment when fresh dissolving agent must be filled in. This operation should be made as user-friendly as possible. Therefore, in an embodiment of the present invention, the housing of the supply container is closed by a lid, which is formed with a connection neck for detachable connection to a corresponding receiving device. The connection neck formed on the lid of the supply container allows the supply container to be very easily and reliably secured in the corresponding receiving device and removed therefrom as a whole in the manner of a plug-type connection or a clamped connection. Besides the examples mentioned, a snap-fit connection or a bayonet-type connection may also be used. What is important is merely that the connection neck and the receiving device have complementary contours and can be form-fittingly connected to each other in a simple manner.

As already explained at the outset, it is particularly important to provide proper isolation between the fresh water-carrying portion of the flowline system and the portion of the flowline system in which the supply container is located to provide a descaling system. For this reason, it is proposed that the flowline which supplies fresh water to the supply container, or the water inlet, have a one-way valve which is disposed immediately upstream of the lid or incorporated in the lid. The one-way valve allows fresh water to enter the supply container, but prevents backflow of dissolved descaling agent.

Since the descaling agent is preferably provided in the form of powder or tablets, the present invention further proposes to provide a sieve-like partition between the reservoir chamber and bottom chamber. The sieve-like partition allows dissolved descaling agent to pass unhindered into the bottom chamber, but at the same time is capable of separating the descaling agent powder or tablets received in the reservoir chamber from the solution. Thus, the capillary line, which has a relatively small inside diameter, can also be prevented from clogging in a simple manner.

A further measure in this regard is to dispose a replaceable filter element between the bottom chamber and the underside of the descaling agent. The filter element is particularly advantageous when descaling agent in powder form is used, because in this case the risk of fine particles entering the bottom chamber is greater than in the case of a descaling agent provided in tablet form. The filter element used may be, for example, a simple non-woven fabric. Of course, other filter elements are also perfectly suitable for separating coarser particles from the liquid.

Since the descaling agent is progressively dissolved over time, it would be an advantage to be able to indicate the fill level within the reservoir chamber of the supply container. It is also desired to prevent erroneous fill level indication, which may be caused by descaling agent adhering to the inner wall of the reservoir chamber. Therefore, in an embodiment of the present invention, a thrust element which is displaceable within the reservoir chamber is disposed above the descaling agent received in the reservoir chamber. The thrust element may be a simple disk which rests on top of the descaling agent and moves down as the descaling agent is consumed. Moreover, the thrust element has the advantage that its own weight causes the descaling agent to be compressed and advanced within the reservoir chamber. The fill level of the reservoir camber may be indicated, for example, using a visual indicator. Such a visual indicator may be provided by providing a transparent portion along the reservoir chamber and providing the disk-type thrust element with a color marking that is visible from the outside.

However, it is much more convenient if the thrust element has a signal source corresponding to a sensing element for detecting the fill level of the reservoir chamber.

In accordance with a particularly simple embodiment, the signal source may be a magnet and the sensing element may be one which is response to a magnetic signal, or vice versa. This would make it possible to implement electronic signal processing, so that the fill level of the supply container could be visually displayed on a display device.

In addition, in accordance with a particularly advantageous proposal of the present invention, the supply container is completely made from plastic or a plastic composite material. These materials are impermeable to liquid and very light in weight. Furthermore, making the supply container from plastic is economical and easy to implement. It is possible to create any desired geometries without the need for expensive finishing. Of course, it is conceivable for the supply container to be molded from plastic as a single piece. Another possibility, however, is to manufacture the bottom chamber of the supply container separately and join it to the supply container. Depending on the plastic selected, such a joint may be an adhesive joint or an ultrasonically welded joint. The lid is also manufactured separately and should be removable to allow for the filling of fresh descaling agent. It is also possible to provide the lid with an opening through which the descaling agent is introduced into the reservoir chamber. In this case, the lid and the bottom chamber can be fixedly joined to the housing of the supply container.

An automatic beverage maker according to the present invention, which is used for preparing beverages with water and has a supply container as described hereinbefore, is characterized in that the flowline system of the automatic beverage maker includes a pump, at least one discharge device, and at least one multi-way valve, and in that the supply container is hydraulically integrated in a bypass of the water flow system of the automatic beverage maker.

The term "discharge device", as used in the context of the present invention, is understood to mean, for example, a steam nozzle, a hot water discharge outlet or, for example, the coffee discharge outlet of an automatic beverage maker in the form of an automatic coffee maker. In the case of other automatic beverage makers, this term may be used in a general sense to refer to the beverage discharge outlet.

The pump is used for conveying the liquids and/or gases within the flowline system and for building up the required pressure. The source for the fresh water used for preparing the beverage and/or for performing the descaling process may simply be a water reservoir. Other solutions include a fixed connection to the mains water supply, which is not explicitly excluded here and should be understood synonymously.

The proposed at least one multi-way valve within the flowline system of the automatic beverage maker is used, in particular, to prevent unwanted entry of dissolved descaling agent into the water-carrying portion of the flowline system. Because the water-carrying portion of the flowline system is reserved for preparing the beverages and making steam, it must be free of descaling agent in order to prevent detrimental effects on health or on the taste.

The multi-way valve in the flowline system of the automatic beverage maker is of substantial importance because it is also used to isolate the portion of the flowline system in which the supply container is integrated from that portion of the flowline system which is used exclusively for the conveyance of water and for preparing the beverages and making hot steam. The bypass approach has the decisive advantage that it can easily and reliably prevent descaling agent residues from entering the flowline system while it is used for preparing a beverage.

If, in accordance with a further proposal of the present invention, the multi-way valve takes the form of a three-way valve, then this makes it possible to implement a plurality of operating positions.

In addition to the aforementioned multi-way valve, it is advantageous if the individual discharge devices can be controlled separately or in groups in order to provide different options for the preparation of beverages. Therefore, in an embodiment of the present invention, at least one valve suitable for controlling the discharge device is integrated into the flowline system upstream of the at least one discharge device. In accordance with this proposal, it is preferred to use a plurality of valves. For example, it is conceivable, to associate one valve with each of the discharge devices.

The method of the present invention for using a supply container for descaling an automatic beverage maker features the steps of:
  introducing the dissolved descaling agent into the flowline system,
  opening the valve upstream of the discharge device until the dissolved descaling agent begins to issue from the at least one discharge device,
  closing the valve and allowing the descaling agent to act on the flowline system for a period of time,
  flushing the flowline system with fresh water for cleaning purposes.

The particular advantage of this method is that it allows the flowlines of the flowline system to be freed from scale residues and to be sterilized, as the case may be, and that it also allows descaling of the valve and the at least one discharge device.

During initial filling of the reservoir chamber with water, it is important to first introduce no more water than is needed for dissolving descaling agent until the bottom chamber is filled with the descaling agent solution. In other words, not all but a portion of the descaling agent is dissolved right from the beginning. Experience has shown that a saturated solution is formed in the bottom chamber. This saturated solution may be released as a concentrate into the flowline system through the capillary line when a descaling procedure is to be performed.

Alternatively, during initial filling of the reservoir chamber with water, it is also possible to introduce water in an amount that fills the reservoir chamber and the bottom chamber, so that the descaling agent will dissolve until a saturated solution is reached in the reservoir chamber.

As explained earlier, the three-way valve can be used to isolate and connect the water-carrying portion of the flowline system and the portion of the flowline system in which the supply container containing the descaling agent is located. It is particularly advantageous here that only one three-way valve is needed to perform several functions. This simplifies the overall configuration of the flowline system.

In order to also descale the three-way valve in an optimal manner, a further proposal of the present invention provides for the three-way valve to assume each of its possible positions at least once during the descaling process to cause flow of descaling agent therethrough. This makes it possible to also clean all parts of the three-way valve and free it from germs, as the case may be.

The present invention will be described below in more detail with reference to the accompanying drawings. The exemplary embodiments shown are merely illustrative of the principle of the present invention, but should not be construed as limiting it to the variants shown. Identical or similar components are denoted by the same reference numerals. For the sake of illustrating the operating principle of the present invention, the figures are greatly simplified schematic views in which components not essential to the invention have been omitted. However, this does not mean that such components are not present in an approach in accordance with the present invention.

In the sectional view of FIG. 1, supply container 6 is shown along with a portion of an adjoining receiving device. Supply container 6 is composed of a housing 1 made of plastic and having a reservoir chamber 4 formed therein. Housing 1 is closed at the top by a lid 12, which is joined in a liquid-tight manner to housing 1 and is provided in its central region with a connection neck 13 which is configured in a dome-like shape and with which the container is sealingly secured in the receiving device by a clamped connection. The lower portion of the container is provided by a bottom chamber 7 which is formed as a separate part from a plastic material and joined to the housing an ultrasonic welding technique, so that as a whole, supply container 6 constitutes a liquid-tight unit. A partition 15 is interposed between reservoir chamber 4 and bottom chamber 7 for separation purposes. This partition has a sieve-like structure, at least in portions thereof, and serves to filter solid particles of the dissolved descaling agent. The filtration efficiency can be further enhanced by disposing a filter element 16, in this case a non-woven fabric, above partition 15. Reservoir chamber 4 has located therein a plurality of axially stacked tablets of compressed descaling agent 5. Moreover, a thrust element 17 is disposed above the descaling agent 5 present in reservoir chamber 4. The weight of this thrust element forces descaling agent 5 toward bottom chamber 7, thereby permanently advancing it. Thus, using thrust element 17, it is possible prevent descaling agent 5 from adhering to the inner wall of reservoir chamber 4. An additional spring may be provided to amplify the weight force. However, this is not always required, and is actually not necessary in the variant shown here. Another very important aspect of this thrust element 17 is that it is also used for the purpose of indicating the fill level of reservoir chamber 4. To this end, thrust element 17 is provided with a signal source 18, in this case a magnet, and supply container 6 is provided with at least one corresponding sensing element responsive to the magnetic signal of signal source 18. This measure facilitates electronic signal acquisition which, for example, in conjunction with a display device not shown here, makes it possible to provide information about the current fill level of supply container 6. A further special feature of the embodiment of a supply container 6 shown in FIG. 1 is that a capillary line 8 opens into bottom chamber 7 and is spirally wound in the region of bottom chamber 7. This capillary line, which has a very small inside diameter and a considerable length, makes it possible to very accurately control the introduction of the dissolved descaling agent into the flowline system, which will be explained in greater detail below.

Capillary line 8 ends in a sleeve 25 within bottom chamber 7, which, on the one hand, serves for attachment of capillary line 8 and, on the other hand, also prevents entry of solid particles of the dissolved descaling agent because capillary line 8 terminates above the bottom of bottom chamber 7, thus preventing clogging of the fine capillary line 8.

Further, a connection flange 29 in the lid-end portion of supply container 6 serves to connect capillary line 8 to the receiving device receiving supply container 6.

As explained earlier, lid 12 of supply container 6 is provided with a dome-like connection neck 13, which is inserted in a corresponding connection geometry of the receiving device. The connection geometry includes also a water inlet 3, which supplies fresh water to supply container 6 in the direction of arrow "A" through a one-way valve 14 and an inlet opening 26 of reduced cross-sectional area each time a descaling procedure is to be performed. One-way valve 14 serves to prevent dissolved descaling agent from entering directly into fresh water-carrying flowline 10 or, in other words, to prevent backflow. As long as no descaling procedure is performed, flowline 12 can only be used as a fresh water line. Flowline 10 has a restriction 11 between water inlet 3 and an outlet 27, where the direction of flow is indicated by arrow "B" and which serves for connecting supply container 6 to the flowline system. Restriction 11 produces a back pressure within water inlet 3, as a result of which an accurately meterable quantity of fresh water is forced through one-way valve 14 into reservoir chamber 4 of supply container 6, where it dissolves a small portion of descaling agent 5. A volume of dissolved descaling agent approximately equal to the amount of water supplied to reservoir chamber 4 can be released through capillary line 8 into the flowline system when a valve provided for this purpose is opened. Consequently, the release of the descaling agent into the flowline system occurs according to the principle of volume displacement. When the valve is closed, the counterpressure within reservoir chamber 4 prevents introduction of fresh water into reservoir chamber 4, so that descaling agent 5 is dissolved only when actually needed. In the example shown here, a portion of flowline 10 is sealed by a stopper 28, because this portion of flowline 10 is not needed.

Figure 2:
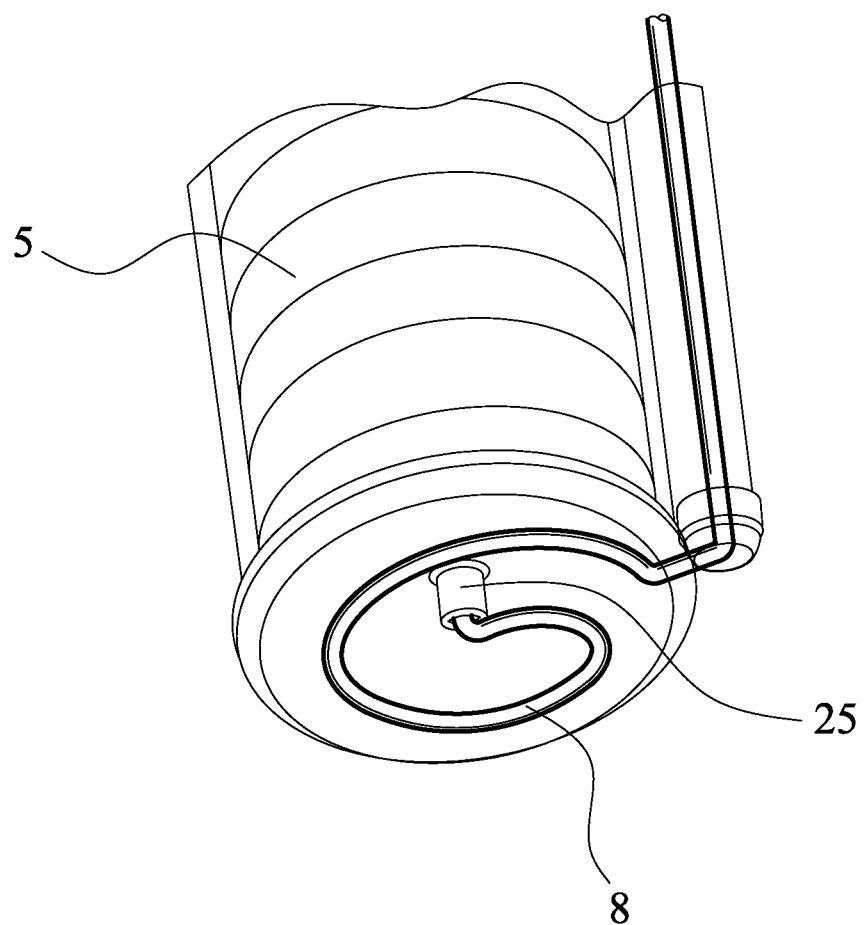
FIG. 2 is a perspective view into the bottom chamber of the supply container.

FIG. 2 gives a perspective view into bottom chamber 7 of supply container 6. Various parts of reservoir chamber 6 are not shown here, so that only the stacked tablets of compressed descaling agent 5 and the isolated upper side of bottom chamber 7 can be seen. The view shows that capillary line 8 has a spirally wound geometry in the region of bottom chamber 7 and terminates with its end portion in a sleeve 25. Furthermore, capillary line 8 runs through a separate, sleeve-shaped portion (not specifically referenced) of housing 1.

Figure 3:
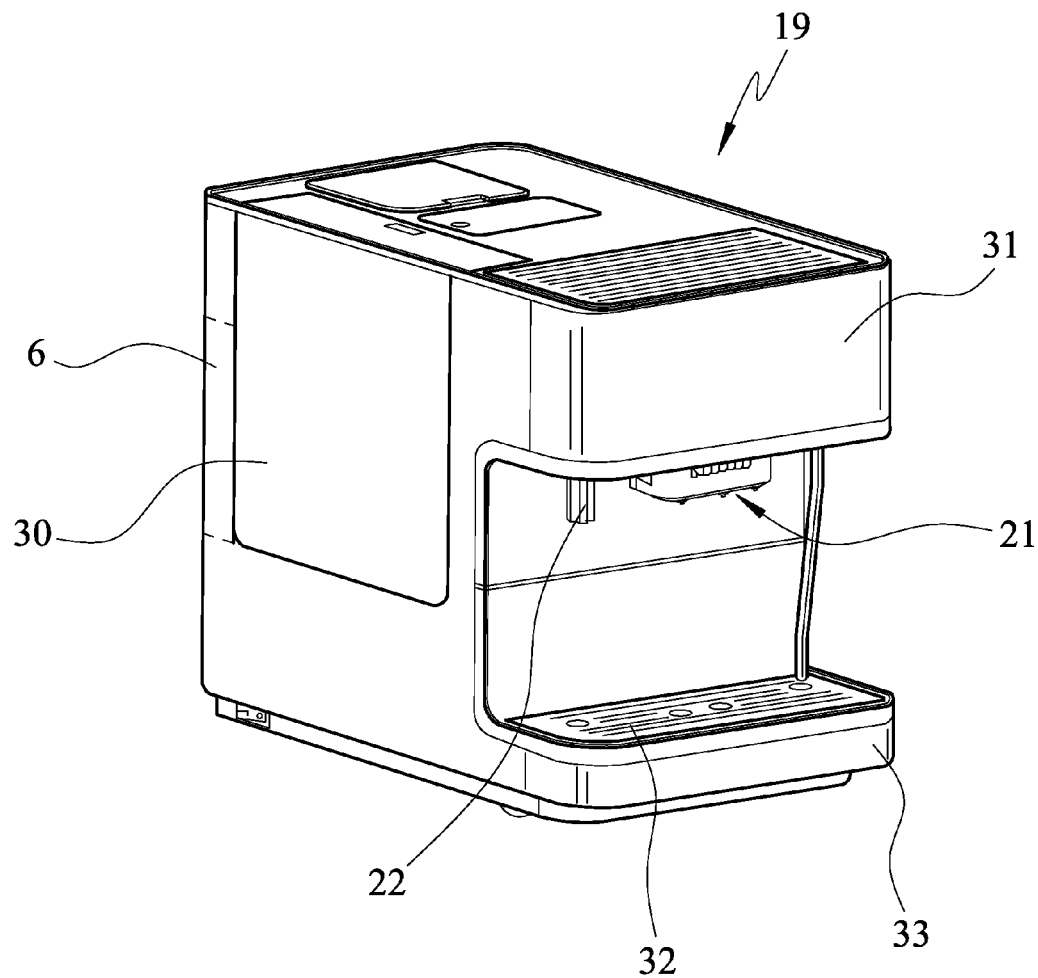
FIG. 3 is a view of an automatic beverage maker having a reservoir chamber.

FIG. 3 illustrates, with the example of an automatic beverage maker 19, how a supply container 6 can be installed in such an automatic beverage maker 19. To this end, automatic beverage maker 19, which may be provided as a stand-alone unit, has a side compartment 30, which is used for insertion or replacement of supply container 6, which is disposed inside the appliance behind this side compartment 30. At its front, automatic beverage maker 19 has a projecting portion 31, in which a plurality of discharge devices 21, 22 are disposed in a concealed manner. In the present case, discharge device 22 is a steam nozzle for dispensing hot steam. Discharge device 21 constitutes a brewing unit having a plurality of nozzles suitable for dispensing coffee beverages. Moreover, in this embodiment, brewing unit 21 is vertically displaceable, so that it can be adjusted to the height of a drinking vessel placed on a tray 33 in order to prevent spilling during the dispensing of the beverage. The top cover of tray 33 is provided by a drip plate 32 formed with openings and slots for collecting liquid residues and discharging them into a collecting tray provided for this purpose under drip plate 32.

Figure 4:
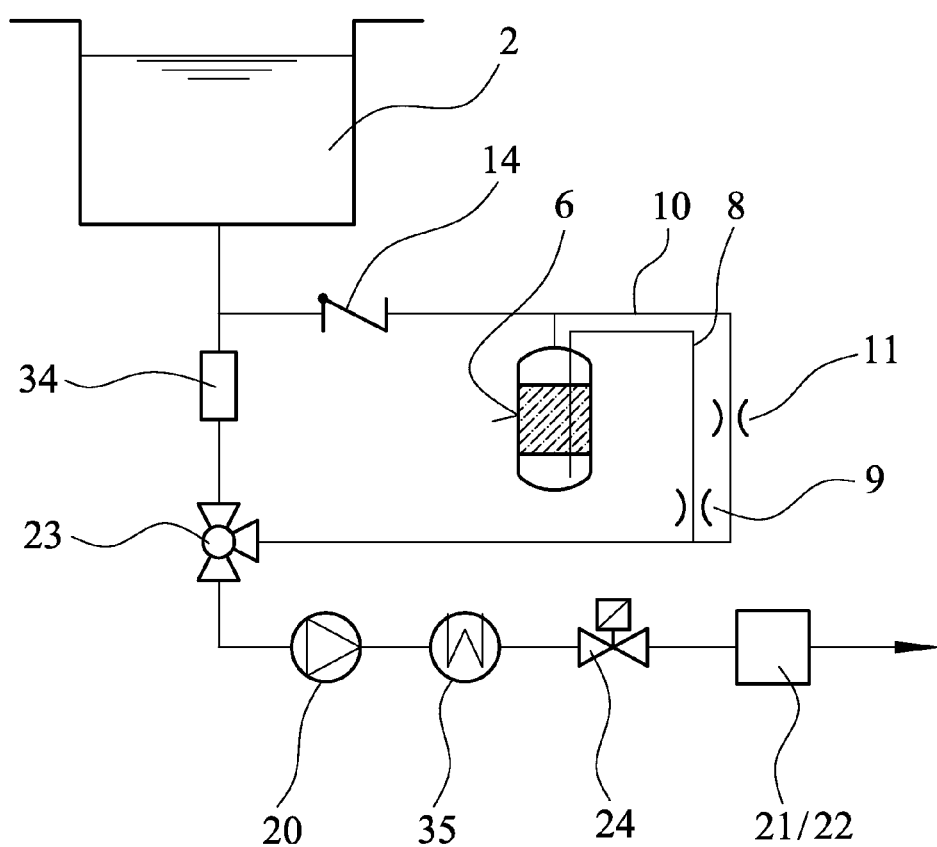
FIG. 4 is a simplified block diagram of a flowline system within an automatic beverage maker.

Finally, FIG. 4 shows a simplified block diagram of a flowline system within an automatic beverage maker 19. The flowline system is supplied with fresh water from a water source 2. The water source shown is a water tank of the automatic beverage maker.

The flowline system is composed of two portions. A first portion is used for preparing beverages, and the other portion branches off as a bypass from this first portion of the flowline system. Supply container 6 is located in the bypass, so that this portion of the flowline system constitutes a descaling system which can be connected to the water-carrying portion of the flowline system as needed. Connection and isolation of the bypass to and from the first portion of the flowline system can be accomplished, on the one hand, by one-way valve 14, which may be disposed above lid 12 of supply container 6 as described hereinbefore, and, on the other hand, by a multi-way valve 23 in the form of a three-way valve. A pump 20 is used to generate the flow within the flowline system and to build up the required pressure. Moreover, the portion of the flowline system that is used for preparing the beverages contains a thermostat 35 for heating the water, as well as a plurality of discharge devices 21, 22, which are indicated merely as a black box in the depicted block diagram and which may be, for example, a steam nozzle 22 and/or a brewing unit 21. An additional multi-way valve 24 is disposed upstream of discharge devices 21, 22 and used to selectively control discharge devices 21, 22. In addition, the flowline system may include a flow rate measuring device 34 serviceable for determining an exact amount of fresh water required to prepare a beverage. Such a measuring device can also be used to determine the number of beverages prepared.

As for the second portion of the flowline system, which is configured as a bypass, the central element is the supply container 6, which is connected by its water inlet 3 to flowline 10 and can thus be supplied with water when a descaling procedure is to be performed. In this case, the capillary line 8 opening into bottom chamber 7 has a separate restriction 9 and is also connected to flowline 10 at a different point. As described earlier in connection with the description of FIG. 1, flowline 10 has a restriction 11, which produces a back pressure within flowline 10, the back pressure enabling the supply of fresh water to supply container 6. The bypass is controlled via three-way valve 23 in connection with one-way valve 14.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS 1 housing
2 water source
3 water inlet
4 reservoir chamber
5 descaling agent
6 supply container
7 bottom chamber
8 capillary line
9 restriction
10 flowline
11 restriction
12 lid
13 connection neck
14 one-way valve
15 partition
16 filter element
17 thrust element
18 signal source
19 automatic beverage maker
20 pump
21 discharge device
22 discharge device
23 multi-way valve
24 multi-way valve
25 sleeve
26 inlet opening
27 outlet
28 stopper
29 connection flange
30 side compartment
31 projecting portion
32 drip plate
33 tray
34 flow rate measuring device
35 thermostat

What is claimed is:

1. A supply container forming part of a descaling system of a flowline system, the supply container comprising:
   a housing having a water inlet suppliable by a water source, the water inlet opening into a reservoir chamber configured to receive a water-soluble descaling agent;
   a bottom chamber in fluid communication with the reservoir chamber, the bottom chamber being configured to collect the descaling agent dissolved by the water; and
   a capillary line connected to and in fluidic connection with the bottom chamber for discharging a solution of the descaling agent,
   further comprising a replaceable filter element in fluidic connection with the reservoir chamber and the bottom chamber and disposed between the bottom chamber and an underside of the descaling agent.

2. The supply container as recited in claim 1, wherein an amount of dissolved descaling agent that is fed through the capillary line into the flowline system during a descaling process is approximately equal to an amount of water that is fed into the reservoir through the water inlet.

3. The supply container as recited in claim 1, wherein an end of the capillary line opposite the bottom chamber opens into a water-carrying flowline of the flowline system in such a way that the flow of water in this flowline generates a negative pressure in the capillary line, which draws the descaling agent therethrough.

4. The supply container as recited in claim 1, wherein the capillary line is at least partially spirally wound.

5. The supply container as recited in claim 1, wherein a restriction is included in at least one of the capillary line or a flowline of the flowline system which supplies fresh water to the supply container.

6. The supply container as recited in claim 1, wherein the housing of the supply container is closed by a lid, which is formed with a connection neck for detachable connection to a corresponding receiving device.

7. The supply container as recited in claim 6, wherein a flowline supplying water to the supply container or the water inlet has a one-way valve disposed immediately upstream of the lid or incorporated in the lid.

8. The supply container as recited in claim 1, further comprising a sieve-like partition disposed between the reservoir chamber and the bottom chamber.

9. The supply container as recited in claim 1, wherein a thrust element which is displaceable within the reservoir chamber is disposed above the descaling agent received in the reservoir chamber.

10. The supply container as recited in claim 9, wherein the thrust element has a signal source corresponding to a sensing element for detecting the fill level of the reservoir chamber.

11. The supply container as recited in claim 10, wherein the signal source is a magnet and the sensing element is one which is response to a magnetic signal.

12. The supply container as recited in claim 1, wherein the supply container is completely made from plastic or a plastic composite material.

13. An automatic beverage maker comprising:
   a flowline system operable to prepare beverages with water, the flowline system including:
   a pump;
   at least one discharge device;
   at least one multi-way valve; and
   a supply container hydraulically integrated in a bypass of the water flow system of the automatic beverage maker, the supply container comprising:
   a housing having a water inlet, the water inlet opening into a reservoir chamber containing a water-soluble descaling agent;
   a bottom chamber in fluid communication with the reservoir chamber, the bottom chamber being configured to collect the descaling agent dissolved by the water; and
   a capillary line connected to and in fluidic connection with the bottom chamber for discharging a solution of the descaling agent.

14. The automatic beverage maker as recited in claim 13, wherein the multi-way valve is a three-way valve.

15. The automatic beverage maker as recited in claim 13, wherein at least one valve suitable for controlling the discharge device is integrated into the flowline system upstream of the at least one discharge device.

16. A supply container forming part of a descaling system of a flowline system, the supply container comprising:
   a housing having a water inlet suppliable by a water source, the water inlet opening into a reservoir chamber configured to receive a water-soluble descaling agent;
   a bottom chamber in fluid communication with the reservoir chamber, the bottom chamber being configured to collect the descaling agent dissolved by the water, and a capillary line connected to and in fluidic connection with the bottom chamber for discharging a solution of the descaling agent, wherein a thrust element which is displaceable within the reservoir chamber is disposed above the descaling agent received in the reservoir chamber.

17. The supply container as recited in claim 16, wherein the thrust element has a signal source corresponding to a sensing element for detecting the fill level of the reservoir chamber.

18. The supply container as recited in claim 17, wherein the signal source is a magnet and the sensing element is one which is response to a magnetic signal.

\* \* \* \* \*